US005698797A

United States Patent [19]

Fontanille et al.

[11] Patent Number: 5,698,797

[45] Date of Patent: Dec. 16, 1997

[54] DEVICE FOR MONITORING A BALL GRINDER

[75] Inventors: Daniel Fontanille, Hermeray; Jacques Barbot, Clamart, both of France

[73] Assignee: GEC Alsthom Stein Industrie, Velizy-Villacoublay, France

[21] Appl. No.: 655,895

[22] Filed: May 31, 1996

[30] Foreign Application Priority Data

Jun. 1, 1995 [FR] France ........................ 95-06523

[51] Int. Cl.[6] ........................ G01M 19/00; G01N 3/56; G01F 23/288

[52] U.S. Cl. ........................ 73/865.9; 73/7; 73/291; 250/357.1; 378/52

[58] Field of Search ........................ 73/865.9, 7, 291, 73/293; 378/51, 52, 54; 356/381; 250/577, 357.1, 358.1, 360.1, 364

[56] References Cited

U.S. PATENT DOCUMENTS

| | | | |
|---|---|---|---|
| 4,156,992 | 6/1979 | Pichette | 451/331 |
| 4,404,640 | 9/1983 | Dumbeck et al. | 364/551.02 |
| 4,577,804 | 3/1986 | Astley et al. | 241/16 |
| 4,635,858 | 1/1987 | Welch et al. | 241/16 |
| 5,224,659 | 7/1993 | Gabardi | 241/34 |

FOREIGN PATENT DOCUMENTS

| | | |
|---|---|---|
| 1607580 | 10/1969 | Germany . |
| 1939567 | 2/1971 | Germany . |
| 2117556 | 10/1972 | Germany . |
| 1607581 | 9/1989 | Germany . |

*Primary Examiner*—Thomas P. Noland
*Attorney, Agent, or Firm*—Sughrue, Mion, Zinn, Macpeak & Seas, PLLC

[57] ABSTRACT

The present invention concerns a device for monitoring a ball grinder having a cylindrical casing containing a mass of balls which, when the grinder is rotating at its nominal speed, takes up a position between two generatrices ($1_b$, $1_{b'}$) spaced by an angle between a minimal angle $\alpha_{min}$ and a maximal angle $\alpha_{max}$ and a mass of coal which, when the grinder is rotating at its nominal speed, takes up a position between two generatrices ($1_c$, $1_{c'}$) spaced by an angle β. An electromagnetic wave emitter is disposed inside the grinder and at least one wave receiver is disposed outside the grinder. The receiver is associated with an electronic circuit for determining at least one parameter of the grinder selected from the quantity of balls, the quantity of coal and the wear of the cylinder.

10 Claims, 3 Drawing Sheets

DEVICE FOR MONITORING A BALL GRINDER

BACKGROUND OF THE INVENTION

1. Field of the Invention

The present invention concerns a device monitoring a ball grinder.

It is more particularly concerned with a device for monitoring a ball grinder with a cylindrical casing containing a mass of balls that, when the grinder rotates at its nominal speed, takes up a position between two generatrices ($1_b$, $1_{b'}$) spaced by an angle between a minimal angle $\alpha_{min}$ and a maximal angle $\alpha_{max}$ and a mass of coal that, when the grinder rotates at its nominal speed, takes up a position between two generatrices ($1_c$, $1_{c'}$) spaced by an angle β.

2. Description of Related Art

When using a ball grinder, it is necessary to verify continuously that the quantity of coal is constant, to secure optimum grinding and optimum drying. If the quantity of coal introduced is too great, the grinding is insufficient and the drying is imperfect; if the quantity of coal introduced is too small, the downstream boiler receives insufficient feed.

Systems have been designed to estimate the quantity of coal contained in an operating ball grinder.

A first system is based on the variation in the measured power absorbed by the electric motor driving the ball grinder. This method is of low sensitivity; also, it requires frequent recalibration as the balls wear down or new balls are added.

Another system is based on the use of level sensors. Pneumatic sensors each including a pneumatic hose with one end inside the grinder are used to measure the pressure difference between two levels; the quantity of coal in the grinder can be deduced from this measurement. However, the level sensors are installed in a hostile environment (coal dust, dropping balls, risk of clogging, etc) with the result that there is a high risk of failure; the sensors are connected to a complex and therefore costly pneumatic unit which is also costly to maintain. The availability of a system of this kind is only moderate.

A further system is based on the noise emitted by the grinder. This method has the drawback of supplying a signal that is highly dependent on the throughput of the grinder, the size of the coal fragments introduced, the quantity of balls present in the grinder and the wear of the armour plating on the inside walls of the grinder.

It is also necessary to monitor the quantity or the mass of balls in the grinder which become worn until their mass is insufficient and therefore ineffective.

There are indirect methods of monitoring changes in the noise or in the electrical power absorbed by the driving electric motor which give the quantity of balls by a correlative method. However, all these methods are indirect methods and are not based on any direct physical measurement.

Finally, it is important to measure the wear of the casing of a ball grinder.

This ensures effective operation of the lifters, which are longitudinal members projecting into the grinder casing conditioning proper mixing of the mixture of coal and balls.

An object of the invention is to provide a device for monitoring a ball grinder enabling continuous monitoring of these three parameters (quantity of coal, quantity of balls, wear of the casing) using sensors outside the polluting atmosphere inside the grinder and independent of the grinding medium.

SUMMARY OF THE INVENTION

The device of the invention enables direct and reliable measurement of these parameters.

To this end the monitoring device of the invention includes an electromagnetic wave emitter disposed inside the grinder and at least one wave receiver disposed outside the grinder, the receiver being associated with an electronic circuit for determining at least one parameter of the grinder selected from the quantity of balls, the quantity of coal and the wear of the cylinder.

In a first embodiment, to monitor the quantity of balls, it includes at least one wave receiver facing the generatrix $1_b$ and at least one wave receiver disposed facing the generatrix $1_{b'}$, corresponding to the angle $\alpha_{min}$, the receivers being associated with an electronic circuit for determining the quantity of balls.

In a first embodiment, to monitor wear of the cylinder, it includes at least one wave receiver disposed outside the angular sectors $\alpha_{max}$ and β, the receiver being associated with an electronic circuit for determining the wear of the cylinder.

In a first embodiment, to monitor the quantity of coal it includes at least one wave receiver in the angular sector β not common to the angular sector αmax, the receiver being associated with an electronic circuit for determining the quantity of coal.

In a second embodiment, to monitor the three parameters, it includes at least one wave receiver disposed to rotate about the longitudinal axis of the cylinder over an angular sector δ greater than the combined angular sector α and β, the receiver being associated with an electronic circuit for determining the wear of the cylinder of the grinder, the quantity of balls and the quantity of coal, the ball grinder containing a mass of balls which, when the grinder is rotating at its nominal speed, takes up a position between two generatrices ($1_b$, $1_{b'}$) spaced by an angle α and a mass of coal which, when the grinder is rotating at its nominal speed, takes up a position between two generatrices ($1_c$, $1_{c'}$) spaced by an angle β.

The emitter is preferably on the longitudinal axis of the cylinder.

The emitter advantageously emits gamma photons.

The electronic circuit for determining the quantity of balls comprises, associated with each receiver, a converter and a lineariser, the output signals of each linearisers being associated to calculate the quantity of balls.

The electronic circuit for determining the wear of the cylinder includes a converter associated with a degree of wear read out device.

The electronic circuit for determining the quantity of coal includes a converter the output signal of which is corrected by the cylinder wear signal measured previously.

BRIEF DESCRIPTION OF THE DRAWINGS

The invention is described in more detail hereinafter with the aid of figures showing preferred embodiments of the invention.

DESCRIPTION OF THE PREFERRED EMBODIMENTS

Figure 1:
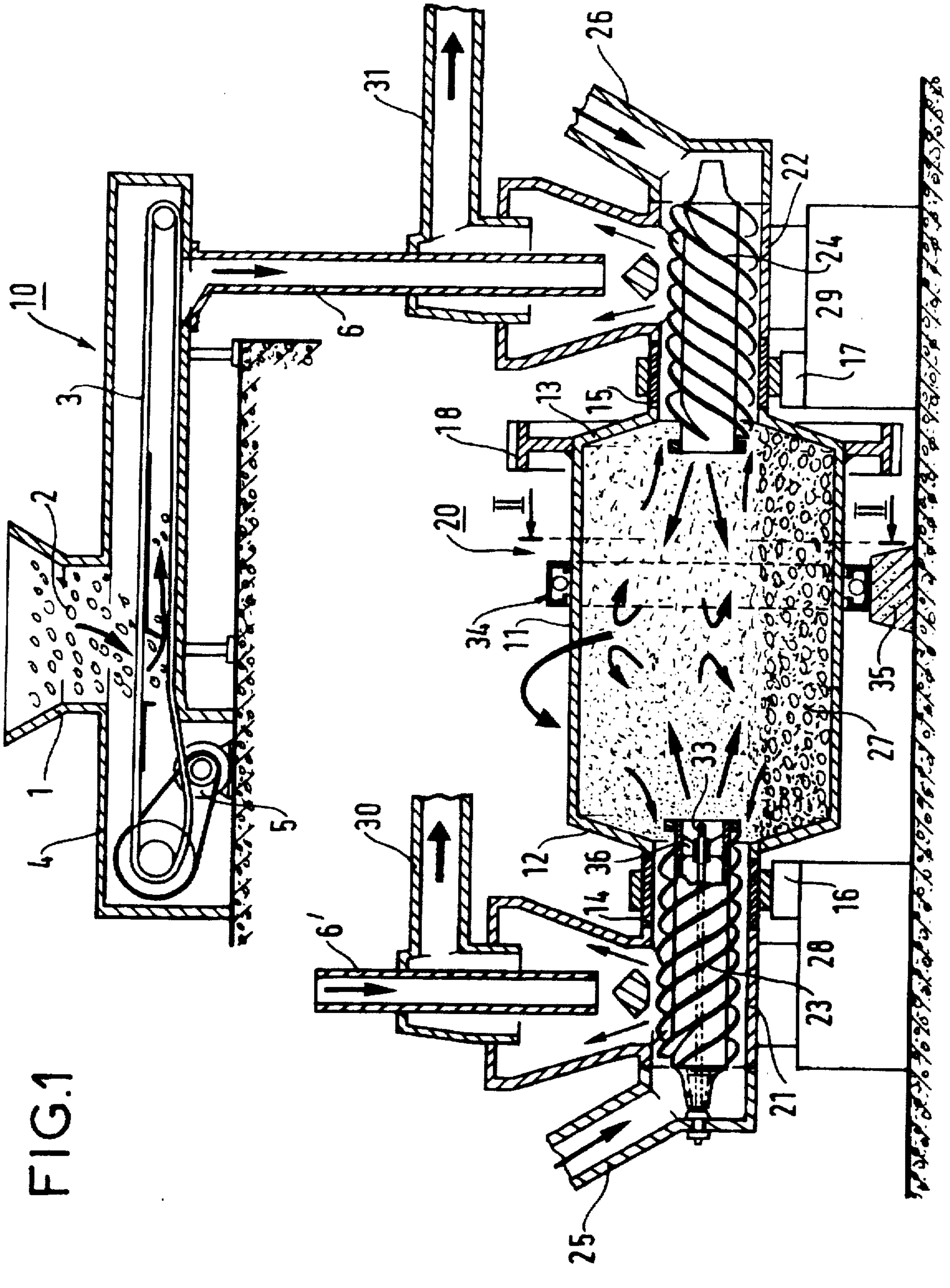
FIG. 1 is a view in longitudinal section of a coal grinding installation provided with a monitoring device of the invention.

In the embodiment described now and shown in FIG. 1, the grinder is a cylindrical grinder with an Archimedes screw feed. It is obvious that the invention applies to any type of ball grinder (biconical grinder, for example) regardless of the device for feeding coal to the interior of the grinder.

FIG. 1 is a diagram showing a coal grinding installation comprising at least one feed device 10 feeding coal to a ball grinder 20.

The feed device 10 comprises a storage hopper 1 from which coal 2 is extracted and fed by a chain conveyor 3 in a box 4 and driven by a motor 5 to a first end of a vertical pipe 6.

The grinder 20 comprises a cylindrical metal casing or cylinder 11 with two conical end portions 12 and 13 to which are fixed respective journals 14 and 15 adapted to support the cylinder. The journals are supported on respective bearings 16 and 17. The grinder is rotated by means of a toothed ring 18 cooperating with a gear (no shown) driven by an electric motor-gearbox (not shown).

Two tubular portions 21 and 22 coaxial with the journals 14 and 15 are provided with respective coaxial elastic Archimedes screws 23 and 24 and rotate with the grinder. Hot air is fed through respective pipes 25 and 26 into the interior of the tubular portions 21 and 22 at a pressure of a few tens of hectopascals. The coal is gravity fed through the pipe 6, the second end of which discharges in line with the tubular portion 22. Coal also reaches the other tubular portion 21 via a pipe 6' from another feed device (not shown). The coal is fed into the grinder by virtue of the rotation of the Archimedes screws 23 and 24.

The grinder is filled with balls 27, for example steel balls. When the cylinder rotates, the balls crush the coal; the fine particles of coal are entrained by the hot air into the annular spaces 28, 29 between the respective journals 14, 15 and the tubular portions 21, 22 and are taken off to the burners via pipes 30 and 31.

The monitoring device includes an emitter 33 of electromagnetic waves disposed inside the cylinder 11. It is fixed and rotatably supported for example in a bush carried by an arrangement of stays 36 welded to the inside of the tubes supporting the Archimedes screw 23. It is advantageously on the longitudinal axis of the cylinder 11. In the preferred embodiment of the invention it emits gamma photons.

A support assembly for receivers 34 disposed outside the cylinder 11 and described in more detail below is disposed around the cylinder 11 and supported by a fixed frame 35.

Figure 2:
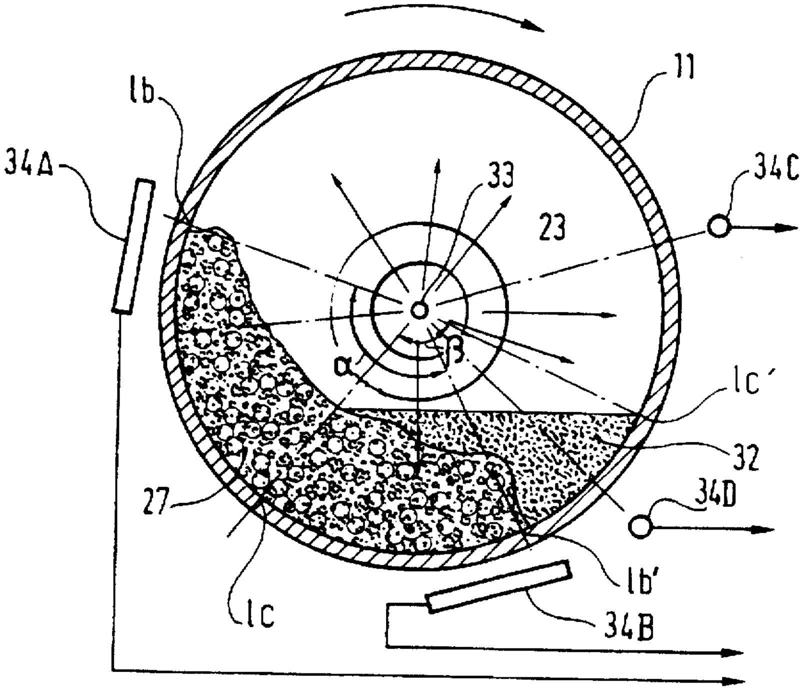
FIG. 2 is a view in section on the line II—II in FIG. 1 of a first embodiment of the monitoring device of the invention.

FIG. 2 is a sectional view of the cylinder, during operation and to a larger scale. It shows the mass of balls 27 displaced in the direction of the arrow by virtue of rotation of the cylinder 11. The mass of coal 32 produced by grinding lies on top of the mass 27. When the grinder is rotating at its nominal speed the mass of balls 27 takes up a position between two generatrices $1_b$, $1_{b'}$ spaced by an angle $\alpha$ between a minimal angle $\alpha_{min}$ and a maximal angle $\alpha_{max}$. When the grinder is rotating at its nominal speed the mass of coal 32 takes up a position between two generatrices $1_c$, $1_{c'}$ spaced by an angle $\beta$.

In the first embodiment shown in FIG. 2, the support assembly 34 carries four receivers:

- a wave receiver 34A facing the generatrix $1_b$ and a wave receiver 34B facing the generatrix $1_{b'}$, corresponding to the angle $\alpha_{min}$, the receiver being associated with an electronic circuit for determining the quantity of balls,
- a wave receiver 34C located outside the angular sectors $\alpha_{max}$ and $\beta$, this receiver being associated with an electronic circuit for determining wear of the cylinder,
- a wave receiver 34D inside the angular sector $\beta$ not common to the angular sector $\alpha$, this receiver being associated with an electronic circuit for determining the quantity of coal.

The emitter 33 scans a beam of waves inside the cylinder 11. The signals generated by the receivers 34A and 34B indicate the area of total absorption due to the presence of the balls 27 or at least verify that this area is greater than the minimal permissible area. The signal generated by the receiver 34C measures wear of the cylinder 11 by determining the variation in absorption as a function of the thickness of the cylinder 11. The signal generated by the receiver 34D measures the quantity of coal 32 by determining the variation of absorption through the mass 32 allowing for the variation due to the thickness of the cylinder 11 determined by means of the receiver 34C.

Figure 3:
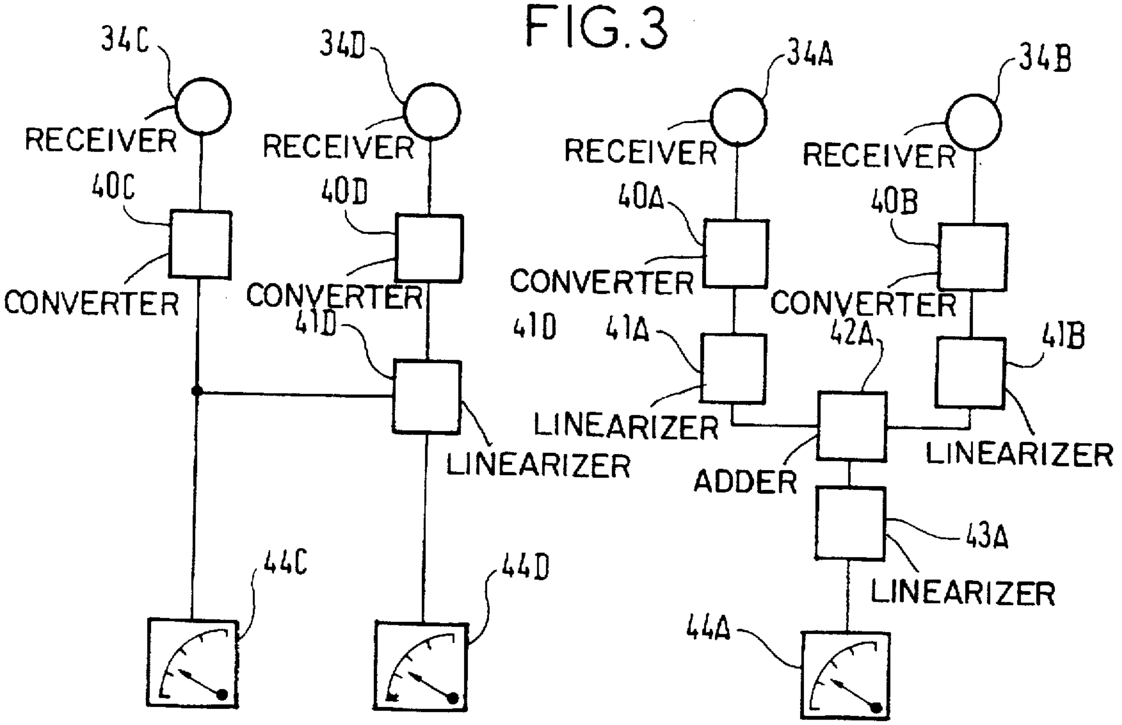
FIG. 3 is a block diagram of an electronic circuit of the monitoring device of the invention.

FIG. 3 is a diagram showing one example of an electronic circuit for measuring the three parameters.

The electronic circuit for determining the quantity of balls comprises, associated with each receiver 34A, 34B, a converter 40A, 40B and a lineariser 41A, 41B, the signals from each lineariser 41A, 41B being summed (42A) and then linearised (43A) to calculate the quantity of balls 27 transmitted to a read out device 44A.

The electronic circuit for determining wear of the cylinder comprises a converter 40C associated with a wear read out device 44C.

The electronic circuit for determining the quantity of coal includes a converter 40D the output signal of which is corrected by differentiation by the signal 41D indicating wear of the cylinder 11 measured at the output of the converter 40C.

Figure 4:
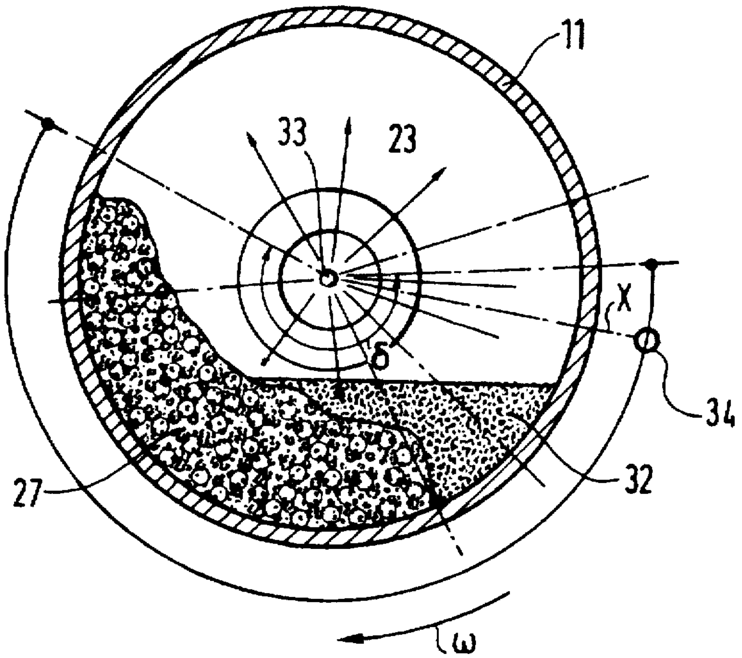
FIG. 4 is a view in section on the line II—II in FIG. 1 of a second embodiment of the monitoring device of the invention.

FIG. 4 shows a second embodiment.

In this embodiment, a wave receiver 34 disposed outside the envelope 11 rotates at a speed $\omega$ about the longitudinal axis of the cylinder 11 over an angular sector $\delta$ greater than the combined angular sectors $\alpha$ and $\beta$, the receiver 34 being associated with an electronic circuit for determining the wear of the cylinder of the grinder, the quantity of balls and the quantity of coal.

Accordingly, the elements to be monitored and observed are "scanned" by means of a position indexing system according to the areas to be observed and the type of measurement to be made.

Figure 5:
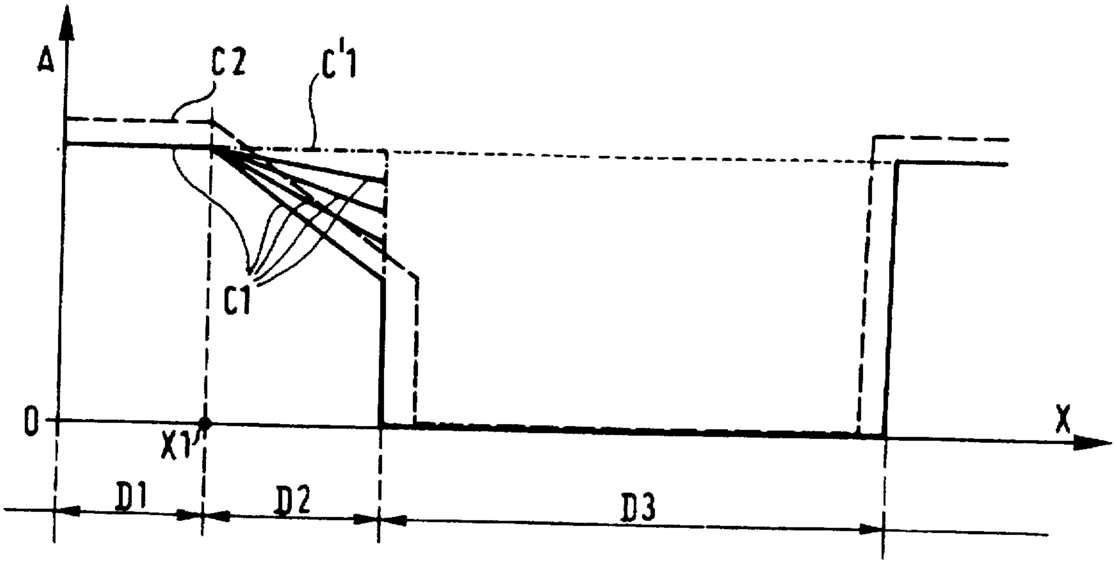
FIG. 5 is a graph showing the monitoring signal obtained by means of the device shown in FIG. 4.

FIG. 5 shows one example of the signal obtained from this monitoring device.

This signal represents the amplitude A of the wave received by the receiver 34 as a function of its position x as it travels along the angular sector $\delta$ at the speed $\omega$.

The first zone D1 monitors wear of the cylinder 11, by determining the evolution of the curve. The curve C2 shows a degree of wear relative to the initial curve C1, for example.

The second area D2 monitors the quantity of coal by monitoring the attenuation of the signal as a function of the abscissa x1. The curve C1' shows the evolution of the signal in the case of an empty grinder, the set of curves C1 showing the trend of the same signal with various amounts of coal.

The third area D3 monitors the quantity of balls 27 by measuring its length along the abscissa axis. The curve C2 shows a decrease in the quantity of balls relative to the initial curve C1, for example.

A signal of this kind can be read out at any time and thereby allows continuous monitoring of the three parameters, namely the wear of the cylinder, the quantity of coal and the quantity of balls in the grinder.

We claim:

1. Device for monitoring a ball grinder including a cylinder containing a mass of balls which, when the grinder is rotating at a nominal speed thereof, takes up a position between two generatrices spaced by an angle between a minimal angle $\alpha_{min}$ and a maximal angle $\alpha_{max}$ and a mass of coal which, when the grinder is rotating at its nominal speed, takes up a position between two generatrices spaced by an angle $\beta$; said device further including an electromagnetic wave emitter disposed inside the grinder and at least one wave receiver disposed outside the grinder, said at least one wave receiver being operatively connected to an electronic circuit for determining at least one parameter of the grinder selected from the group consisting of quantity of balls, quantity of coal and wear of the cylinder.

2. Device according to claim 1 further including at least one wave receiver facing a generatrix $1_b$ and at least one wave receiver facing a generatrix $1_{b'}$, defining therebetween the angle $\alpha_{min}$, and these receivers being operatively connected to an electronic circuit for determining the quantity of balls.

3. Device according to claim 2 wherein said at least one receiver comprises at least two receivers and wherein the electronic circuit for determining the quantity of balls comprises, associated with each of said at least two receivers, a converter and a linearizer, and wherein output signals of each linearizer are operatively connected to an adder to calculate the quantity of balls.

4. Device according to claim 1 further including at least one further wave receiver disposed outside angular sectors defined by $\alpha_{max}$ and $\beta$, said at least one further receiver being being operatively connected to an electronic circuit for determining the wear of the cylinder.

5. Device according to claim 4 wherein the electronic circuit for determining the wear of the cylinder includes a converter operatively connected to a degree of wear read out device.

6. Device according to claim 1 further including at least one wave receiver in a portion of an angular sector defined by $\beta$ not common to an angular sector defined by $\alpha$ and being operatively connected to an electronic circuit for determining the quantity of coal.

7. Device according to claim 4 wherein said electronic circuit generates a cylinder wear signal and determines the quantity of coal using a converter which produces a converter output signal which is corrected by the cylinder wear signal emitted from the electronic circuit for determining the wear of the cylinder and directly connected to a linearizer within the electronic circuit for determining the quantity of coal, downstream of the converter thereof.

8. Device according to claim 1 for monitoring a ball grinder containing a mass of balls which, when the grinder is rotating at nominal speed, takes up a position between two generatrices spaced by an angle $\alpha$ and a mass of coal which, when the grinder is rotating at its nominal speed, takes up a position between two generatrices spaced by angle $\beta$, characterized in that it includes at least one wave receiver disposed to rotate about a central longitudinal axis of the cylinder over an angular sector $\delta$ greater than combined angular sectors defined by $\alpha$ and $\beta$, and being operatively coupled to an electronic circuit for determining the wear of the cylinder of the grinder, the quantity of balls and the quantity of coal.

9. Device according to claim 1 wherein the emitter is on a central longitudinal axis of the cylinder.

10. Device according to claim 1 wherein the emitter emits gamma photons.

* * * * *